United States Patent
Yoneyama

(10) Patent No.: US 6,927,907 B2
(45) Date of Patent: Aug. 9, 2005

(54) VIEWING DEVICE

(75) Inventor: Shuji Yoneyama, Saitama (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/646,726

(22) Filed: Aug. 25, 2003

(65) Prior Publication Data
US 2004/0036965 A1 Feb. 26, 2004

(30) Foreign Application Priority Data
Aug. 26, 2002 (JP) ................................ P2002-245621

(51) Int. Cl.[7] .......................................... G02B 23/00
(52) U.S. Cl. .................. 359/424; 359/399; 359/427; 396/382
(58) Field of Search .................. 359/399–429, 359/808–819, 642–648

(56) References Cited

U.S. PATENT DOCUMENTS

| | | | | |
|---|---|---|---|---|
| 3,942,901 A | * | 3/1976 | Ekstrand | 356/251 |
| 4,589,744 A | * | 5/1986 | Kimura et al. | 359/428 |
| 4,721,375 A | | 1/1988 | Van Dulman | 359/429 |
| 4,981,331 A | * | 1/1991 | Taylor | 359/896 |
| 5,309,201 A | * | 5/1994 | Lyon | 396/382 |
| 5,414,557 A | | 5/1995 | Phillips | 359/428 |
| 5,786,935 A | | 7/1998 | Kanai et al. | 359/509 |
| 5,867,250 A | * | 2/1999 | Baron | 351/212 |

FOREIGN PATENT DOCUMENTS

| | | | | |
|---|---|---|---|---|
| FR | 2240461 | | 3/1975 | |
| GB | 2167204 | | 5/1986 | |
| JP | 6-109985 | * | 4/1994 | 359/399 |
| JP | 7-120686 | | 5/1995 | |

OTHER PUBLICATIONS

English Language Abstract FR2240461.

* cited by examiner

Primary Examiner—Thong Q Nguyen
(74) Attorney, Agent, or Firm—Greenblum & Bernstein, P.L.C.

(57) ABSTRACT

A reference plate is situated on an optical axis of an eyepiece. The reference plate includes a first glass plate and a second glass plate. One surface of the first glass plate and one surface of the second glass plate are bonded. Cross hairs are formed on the bonded surface of the first glass plate by using a chromium plating and so on. A radius of curvature of the bonded surface accords with the field curvature of the sagittal image surface of the eyepiece.

7 Claims, 16 Drawing Sheets

VIEWING DEVICE

BACKGROUND OF THE INVENTION

1. Field of the Invention

The present invention relates to viewing devices which are used for surveying, astronomical observation, and so on, such as binoculars and telescopes, etc.

2. Description of the Related Art

Viewing devices, such as binoculars, telescopes and such like, which are used for surveying, astronomical observation, and so on have a viewing optical system which is composed of an eyepiece and an objective optical system. The field curvature of the eyepiece and the objective optical system is respectively corrected. Accordingly, the field curvature of the viewing optical system is totally corrected, so that the field of view obtained through the viewing optical system is fine.

Some viewing devices include a reference plate which is positioned between the objective optical system and the eyepiece. The reference plate is a clear plate, and a reticle, such as cross hairs, or a scale, etc, is formed on the surface by chromium plating. Most reticles are formed radially extending outward on a plane perpendicular to an optical axis of the viewing optical system, intersecting with the optical axis. When a user observes an objective through the eyepiece of the viewing device, the reticle can be viewed with the objective, so that the reticle facilitates the survey and observation.

As described above, generally, the field curvature of the optical system which is provided in the viewing device is corrected for the eyepiece and the objective optical system independently. Accordingly, the field curvature can be corrected for different combinations of eyepieces and objective optical systems.

However, there are some eyepieces which are made for use with predetermined objective optical systems, there are some eyepieces, composed of lenses the number of which is reduced to save cost, and some eyepieces are adapted for a wide-field. The field curvature of these kinds of eyepiece is not always corrected.

Namely, even though the field curvature of an eyepiece is not corrected, the field curvature of the viewing optical system which is composed by the eyepiece and objective lens is corrected. Accordingly, an image of an object, which is viewed through the eyepiece and the objective optical system, is not blurred. However, the reference plate is situated between the objective optical system and the eyepiece, and the reference plate is viewed only through the eyepiece. Accordingly, if the field curvature of the eyepiece is not corrected, the image of the reticle is partially blurred.

Further, the above-mentioned viewing devices can be provided with a frame which determines the field of view obtained when viewed through the eyepiece. The frame masks a peripheral portion of the optical path of luminous flux which passes through the viewing optical system, so that the field of view is determined. On the other hand, as described above, most of the reticles are formed to extend radially from the optical axis. Accordingly, when the field curvature of the eyepiece is not properly corrected, the border of the frame and the reticle can not be clearly viewed at the same time.

If the lens system is designed such that the field curvature of each of the eyepieces and the objective optical systems can be corrected, the above-mentioned problems can be resolved, however, this causes the problem of increased manufacturing cost.

SUMMARY OF THE INVENTION

Therefore, an object of the present invention is to provide a viewing device in which the reticle can be clearly viewed.

In accordance with an aspect of the present invention, there is provided a viewing device comprising: an eyepiece; and a reference plate that is provided with a first clear plate including a reticle forming surface on which a reticle is formed. The reference plate is positioned on an optical axis of the eyepiece. The reticle forming surface is curved in accordance with a field curvature of the eyepiece. According to this structure, both an object and the rectile are clearly viewed.

Preferably, the reticle forming surface is curved so as to approximately accord with a field curvature of a sagittal image surface of the eyepiece. According to this structure, the rectilce, which extends radially from the optical axis, is clearly seen in its entirety.

More preferably, the reference plate is provided with a frame forming surface on which a frame for a field of view is formed. Optionally, the reference plate is composed of two clear plates including the first clear plate, and the two plates are bonded in such a manner that the reticle forming surface is a bonded surface. Further, optionally, the reference plate may have no significant refracting power, and in the reference plate, both an incidence surface and an exit surface may be plane.

For example, the reference plate may include a second clear plate that is provided with a frame forming surface on which a frame for a field of view is formed, and the reticle forming surface and the frame forming surface may be placed so as to face each other, and the radius of curvature of the reticle forming surface and the radius of curvature of the frame forming surface may be different.

Preferably, the frame forming surface is curved so as to approximately accord with a field curvature of a meridional image surface of the eyepiece.

Preferably, the viewing device includes a sealing member that hermetically seals a gap which is formed between the peripheral portions of the first and second clear plates.

According to the present invention, since the reference plate is provided with the frame forming surface, it is not necessary to provide an extra frame member, besides the reference plate, for determining the field of view. Accordingly, the number of members can be reduced.

Further, when the reticle forming surface and the frame forming surface are hermetically sealed, dust is prevented from collecting on each of the surfaces and the surfaces are prevented from being damaged. Accordingly, the field of view obtained through the eyepiece is kept clean at all times.

The frame of the field of view is formed along the peripheral direction. If the reticles are formed to extend radially from the optical axis, it is difficult to clearly view both the reticles and the frame. However, when the curve of the reticle forming surface is accorded with the field curvature of the sagittal image surface, and the curve of the frame forming surface is accorded with the field curvature of the meridional image surface, both the reticle and the frame can be clearly viewed.

Further, when the sealing member is provided, dust and so on is prevented from entering the gap between the first and second clear plates. Accordingly, the reticle forming surface and the frame forming surface are kept clean, and the field of view obtained through the eyepiece is kept clean at all times.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
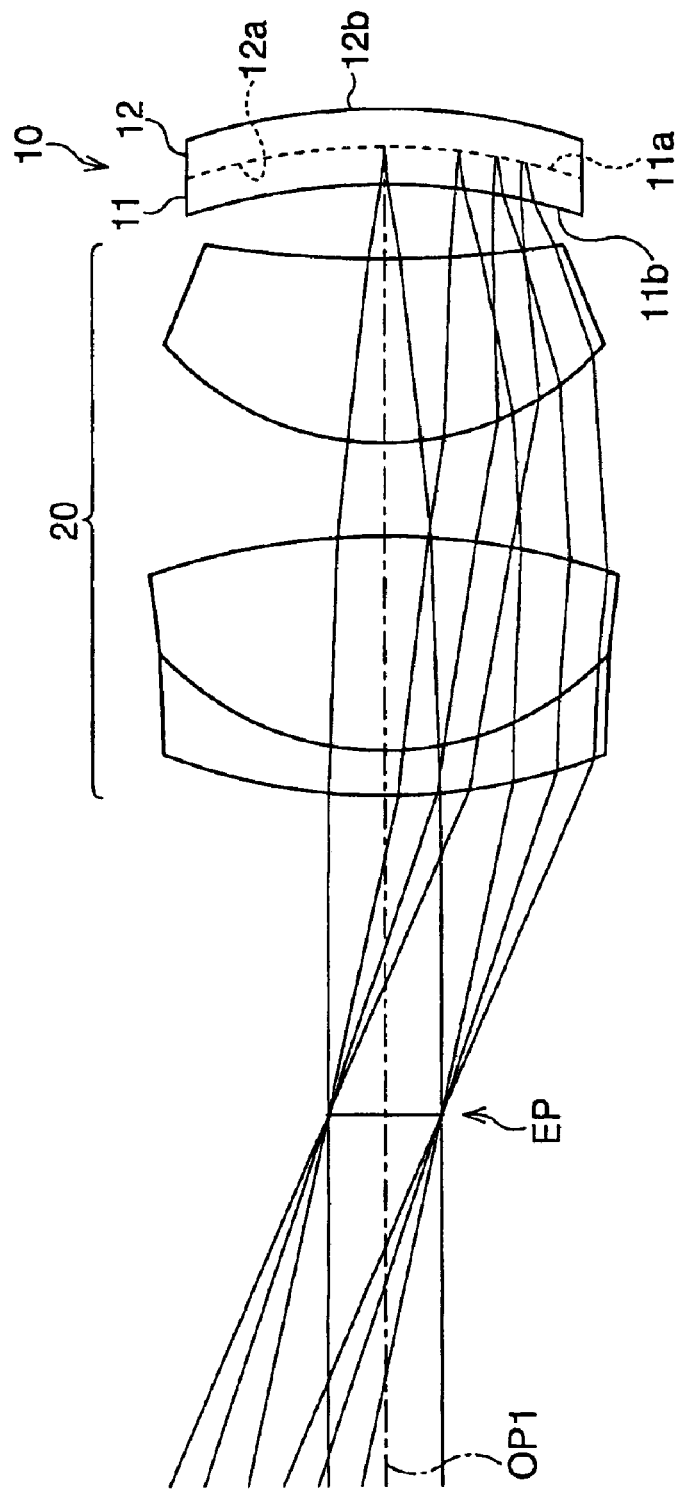
FIG. 1 is a drawing which shows a structure of an eyepiece and a reference plate of a viewing device to which a first embodiment according to the present invention is applied.

The present invention will now be described with reference to an embodiment shown in the drawings.

FIG. 1 shows an eyepiece and a reference plate of a viewing device to which a first embodiment according to the present invention is applied. A reference plate 10 is situated on an optical axis OP1 of an eyepiece 20. An observer observes an object through the eyepiece 20 of the viewing device, at a pupil position EP which exists at a left side of the eyepiece 20 in FIG. 1.

The reference plate 10 includes a glass plate 11 (first clear plate) and a glass plate 12 (second clear plate). A surface 11a of the glass plate 11 and a surface 12a of the glass plate 12 are bonded. A reticle, for example, the cross hairs shown in FIG. 2, the scale shown in FIG. 3, and so on, is formed on the surface 11a of the glass plate 11 by using a chromium plating.

The following TABLE 1 represents optical data of the first embodiment. The data in TABLE 1 represents the optical characteristics of the reference plate 10 and the eyepiece 20, in a state where a luminance is incident at the left side of FIG. 1. In TABLE 1, F denotes the focal length of the eyepiece 20. NO denotes surface number, R denotes a radius of curvature of each surface, D denotes a distance (unit: mm) between surfaces along the optical axis OP1, N(d) denotes a refractive index of the d-line and Vd denotes the Abbe numbers.

TABLE 1

F = 9.65
apparent field of view = 22.9°

| NO | R | D | N(d) | Vd |
|---|---|---|---|---|
| Pupil position | INFINITY | 8.70 | | |
| 1 | 16.161 | 1.20 | 1.78472 | 25.7 |
| 2 | 8.190 | 5.75 | 1.69680 | 55.5 |
| 3 | −19.310 | 2.54 | | |
| 4 | 7.700 | 5.00 | 1.49176 | 57.4 |
| 5 | 30.030 | 2.02 | | |
| 6 | −16.840 | 1.00 | 1.51633 | 64.1 |
| 7 | −16.840 | 1.00 | 1.51633 | 64.1 |
| | image surface | | | |
| 8 | −16.840 | 1.00 | | |

The sixth surface is the surface 11b of the glass plate 11, and the eighth surface is the surface 12b of the glass plate 12. The surfaces 11a and 12a, which are bonded, correspond to the seventh surface. As apparent from FIG. 1 and TABLE 1, the incident surface (the surface 11b of the glass plate 11, the sixth surface) and the exit surface (the surface 12b of the glass plate 12, the eighth surface) of the reference plate 10 curve at the same radius of curvature (−16.840) as that of the surface 11a which is the reticle forming surface. This radius of curvature is determined such that the sagittal ray of the eyepiece 20, which passes through the glass plate 11, is imaged on the surface 11a.

Figure 2:
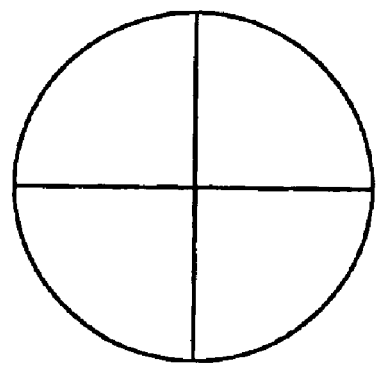
FIG. 2 is a drawing which shows a cross which is one example of a reticle.
Figure 3:
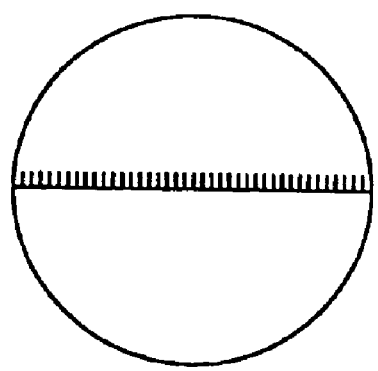
FIG. 3 is a drawing which shows a scale which is another example of a reticle.
Figure 4:
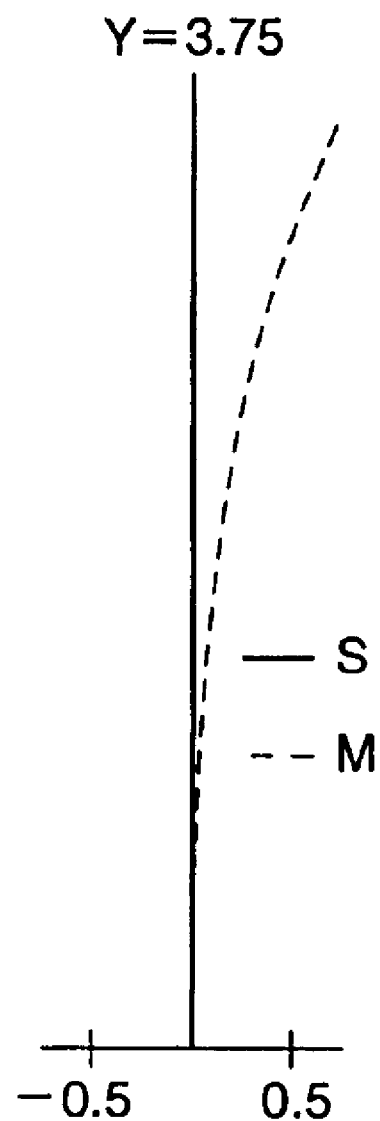
FIG. 4 is a graph which shows a relationship between a reticle forming surface of the reference plate and the astigmatism of an eyepiece in the first embodiment.

FIG. 4 is a graph showing an astigmatism of the eyepiece 20, on the surface 11a of the glass plate 11 of the reference plate 10. The axis of ordinates represents the surface 11a, the rigid line S represents the sagittal image surface, the broken line M represents the meridional image surface, Y denotes the radius (unit: millimeter) of the frame of field of view. As the reticle of FIG. 2, which is cross hairs, and the reference of FIG. 3, which is a scale, radially extend, the image of the reticles through the eyepiece partially blurs. However, according to the first embodiment, as shown in FIG. 4, the surface 11a of the reticle forming surface accords with the sagittal image surface. Accordingly, when the reticles of FIGS. 2 and 3 are viewed through the eyepiece 20 at the pupil position EP, the image of the reticles does not partially blur.

Further, in the first embodiment, the incident surface and the exit surface of the reference plate 10 are curved at the same radius of curvature as that of the surface 11a which corresponds to the reticle forming surface. Accordingly, the reference plate 10 has no significant refracting power, and if the reference plate 10 is situated in the viewing optical system, it hardly influences the aberration of the viewing optical system.

Further, since the radius of curvature of the incident surface, the exit surface, and the surface 11a are identical, the number of jigs, which are needed to manufacture the viewing device, is reduced compared with a state where these radiuses are different. Accordingly, the manufacturing process is simplified.

Figure 5:
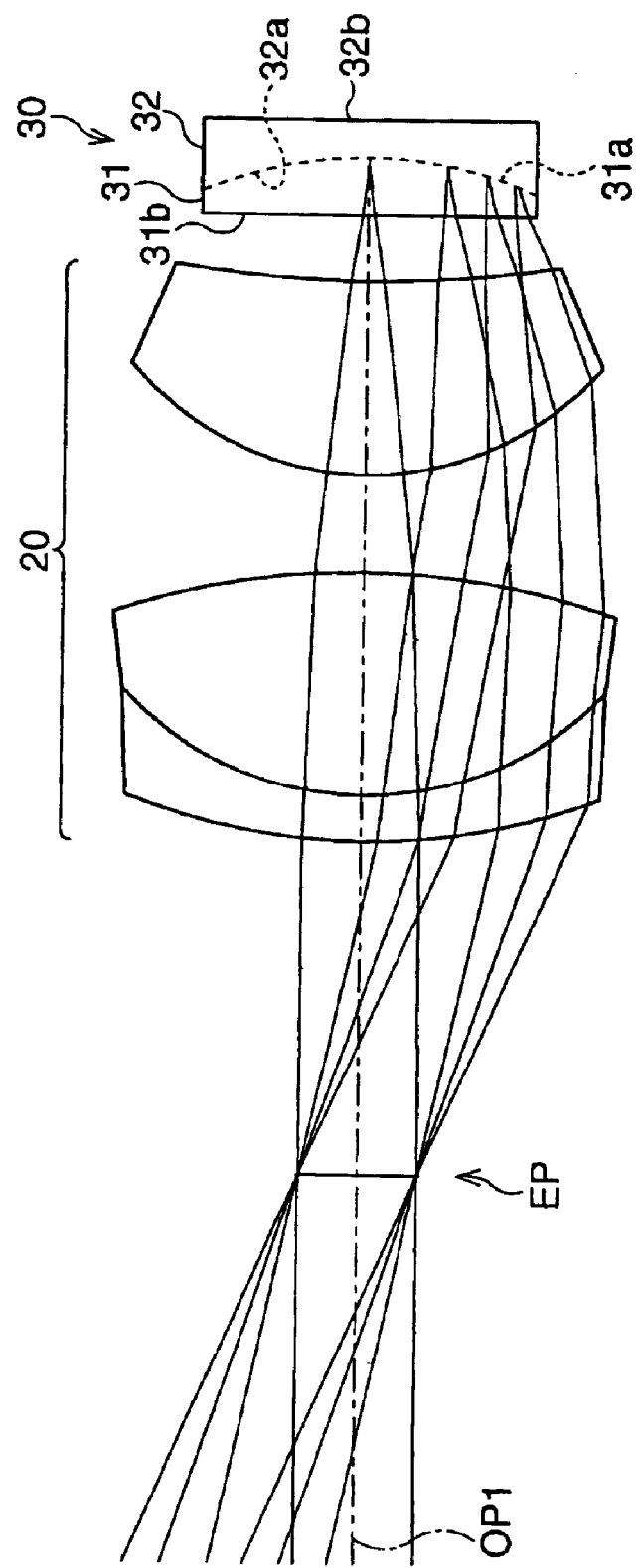
FIG. 5 is a drawing which shows a structure of an eyepiece and a reference plate of a viewing device to which a second embodiment according to the present invention is applied.

FIG. 5 shows an eyepiece and a reference plate of a viewing device to which a second embodiment according to the present invention is applied. In the second embodiment, the eyepiece 20 of the first embodiment is used. The reference plate 30 includes a glass plate 31 and a glass plate 32. A surface 31a of the glass plate 31 and a surface 32a of the glass plate 32 are bonded. Similarly to the first embodiment, the reticle of FIGS. 2 and 3 is formed on the surface 31a by chromium plating or such like.

The following TABLE 2 represents optical data of the second embodiment. The data of TABLE 2 represents the optical characteristics of the reference plate 30 and the eyepiece 20, in a state where a luminance is incident at the left side of FIG. 5. Symbols in TABLE 2 are identical to those in TABLE 1.

TABLE 2

F = 9.43
apparent field of view = 23.4°

| NO | R | D | N(d) | Vd |
|---|---|---|---|---|
| pupil position | | 8.70 | | |
| 1 | 16.161 | 1.20 | 1.78472 | 25.7 |
| 2 | 8.190 | 5.75 | 1.69680 | 55.5 |
| 3 | −19.310 | 2.54 | | |
| 4 | 7.700 | 5.00 | 1.49176 | 57.4 |
| 5 | 30.030 | 1.68 | | |
| 6 | INFINITY | 1.50 | 1.51633 | 64.1 |
| 7 | −10.500 | 1.00 | 1.51633 | 64.1 |
| | image surface | | | |
| 8 | INFINITY | | | |

The sixth surface corresponds to the surface 31b of the glass plate 31, and the eighth surface corresponds to the surface 32b of the glass plate 32. The surface 31a of the glass plate 31 and the surface 32a of the glass plate 32, which are bonded, correspond to the seventh surface. As is apparent from FIG. 5 and TABLE 2, in the second embodiment, the incident surface (the surface 31b of the glass plate 31, the sixth surface) and the exit surface (the surface 32b of the glass plate 32, the eighth surface) of the reference plate 30 are flat planes. The radius of curvature (−10.500) of the surface 31a which is the reticle forming surface is determined such that the sagittal ray of the eyepiece 20, which passes through the plane surface 31b, is imaged on the surface 31a. In other words, in the reference plate 30, the incident and the exit surfaces are planar, and only the surfaces which are bonded are curved in accordance with the field curvature of the sagittal image surface.

Figure 6:
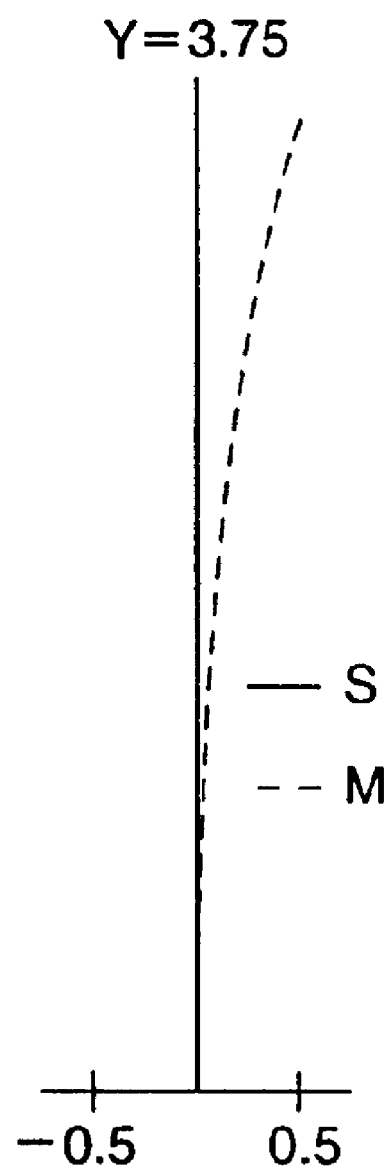
FIG. 6 is a graph which shows a relationship between a reticle forming surface of a reference plate and the astigmatism of an eyepiece in the second embodiment.

FIG. 6 is a graph showing an astigmatism of the eyepiece 20, on the surface 31a of the glass plate 31 of the reference plate 30 in the second embodiment, similarly to FIG. 4. As shown in FIG. 6, the surface 31a of the reticle forming surface (the axis of oridinates) accords with the sagittal image surface. Accordingly, an effect similar to that of the first embodiment can be obtained.

Further, in the second embodiment, since the incident and the exit surfaces of the reference plate 30 are flat planes, the reference plate 30 has no significant refracting power. Accordingly, if the reference plate 30 is situated in the viewing optical system, it hardly influences the aberration of the viewing optical system. Further, there is another advantage that the plane surfaces are relatively easy to make.

Figure 7:
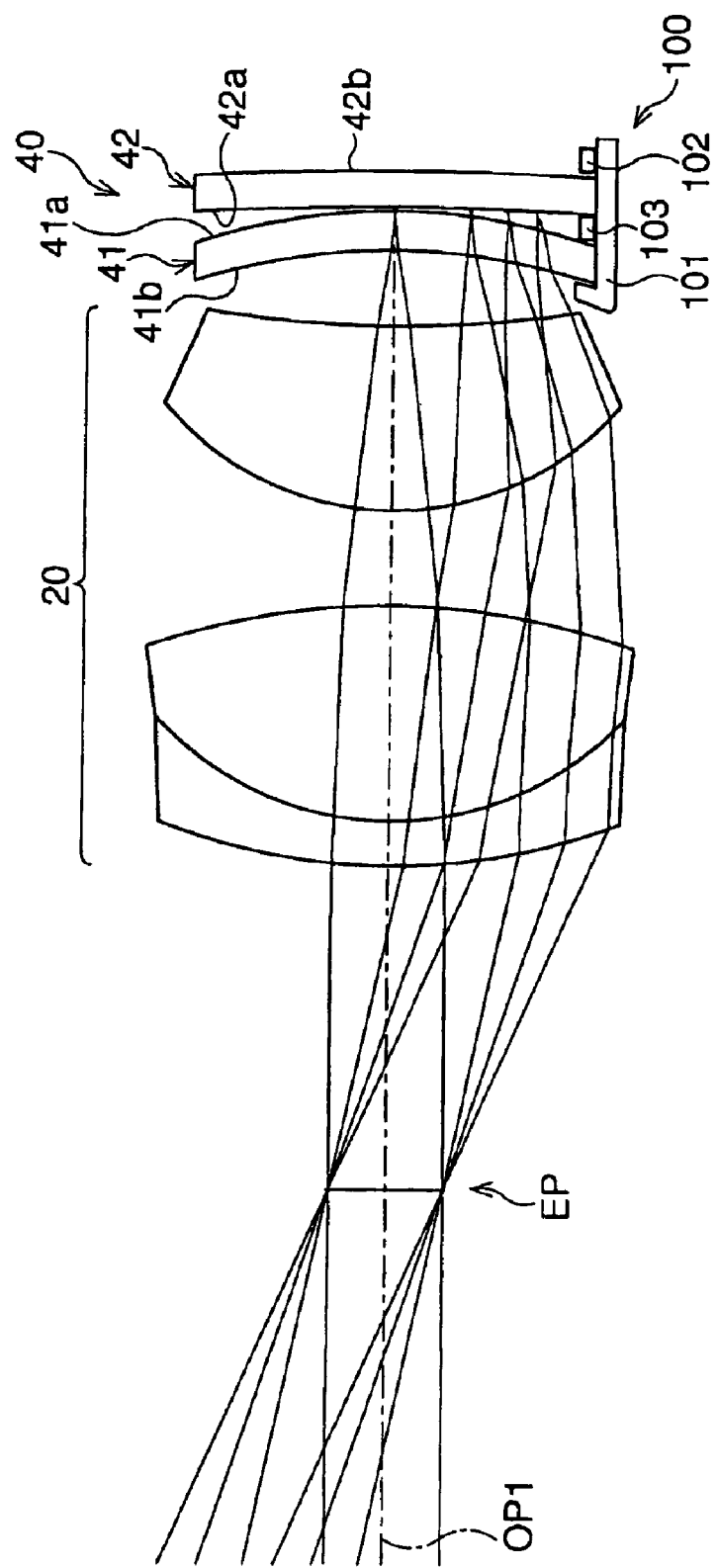
FIG. 7 is a drawing which shows a structure of an eyepiece and a reference plate of a viewing device to which a third embodiment according to the present invention is applied.
Figure 8:
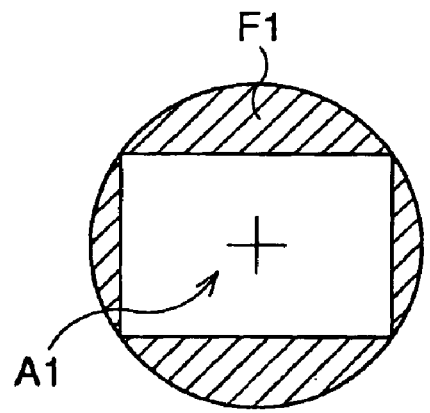
FIG. 8 is a drawing which shows one example of a frame of field of view.
Figure 9:
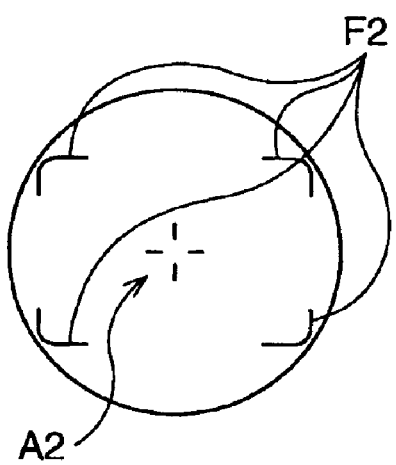
FIG. 9 is a drawing which shows another example of a frame of field of view.

FIG. 7 shows an eyepiece and a reference plate of a viewing device to which a third embodiment according to the present invention is applied. The eyepiece 20 of the third embodiment is identical to that of the first and second embodiments. A reference plate 40 includes a glass plate 41 and a glass plate 42. A reticle A1 shown in FIG. 8 or a reticle A2 shown in FIG. 9 is formed on a surface 41a (the reticle forming surface) of the glass plate 41 by chromium plating and so on. A frame of field of view F1 of FIG. 8 or a frame of field of view F2 of FIG. 9 is formed by chromium plating, on a surface 42a (frame forming surface) of the glass plate 42, which faces the surface 41a of the glass plate 41. As shown in FIGS. 8 and 9, the frames F1 and F2 are formed along the peripheral direction. Further, the glass plates 41 and 42 are situated in such a manner that a predetermined gap exists between them.

The following TABLE 3 represents optical data of the third embodiment. The data of TABLE 3 represents optical characteristics of the reference plate 40 and the eyepiece 20, in a state where a luminance is incident at the left side of FIG. 7.

TABLE 3

F = 9.62
apparent field of view = 23.7°

| NO | R | D | N(d) | Vd |
|---|---|---|---|---|
| pupil position | | 8.70 | | |
| 1 | 16.161 | 1.20 | 1.78472 | 25.7 |
| 2 | 8.190 | 5.75 | 1.69680 | 55.5 |
| 3 | −19.310 | 2.54 | | |
| 4 | 7.700 | 5.00 | 1.49176 | 57.4 |
| 5 | 30.030 | 2.02 | | |
| 6 | −16.840 | 1.00 | 1.51633 | 64.1 |
| 7 | −16.840 | 0.10 | | |
| | (cross hairs) | | | |
| 8 | −75.000 | 1.00 | 1.51633 | 64.1 |
| | (frame of field of view) | | | |
| 9 | −75.000 | | | |

The sixth surface corresponds to the surface 41b of the glass plate 41, the seventh surface corresponds to the surface 41a of the glass 41, the eighth surface corresponds to the surface 42a of the glass plate 42, and the ninth surface corresponds to the surface 42b of the glass plate 42. The sixth and seventh surfaces have the same radius of curvature (−16.840). The value of this radius of curvature is identical to that of the surface 11a of the first embodiment (see FIG. 1 and TABLE 1). Namely, the value of the radius of curvature is determined such that the sagittal ray of the eyepiece 20, which passes through the surface 41b of the glass plate 41, is imaged on the surface 41a.

Further, the eighth and ninth surfaces have the same radius of curvature (−75.000). The value of this radius of curvature is determined such that the meridional ray of the peripheral portion of the eyepiece 20, which passes through the eyepiece 20 and the glass plate 41, is imaged on the surface 42a.

Figure 10:
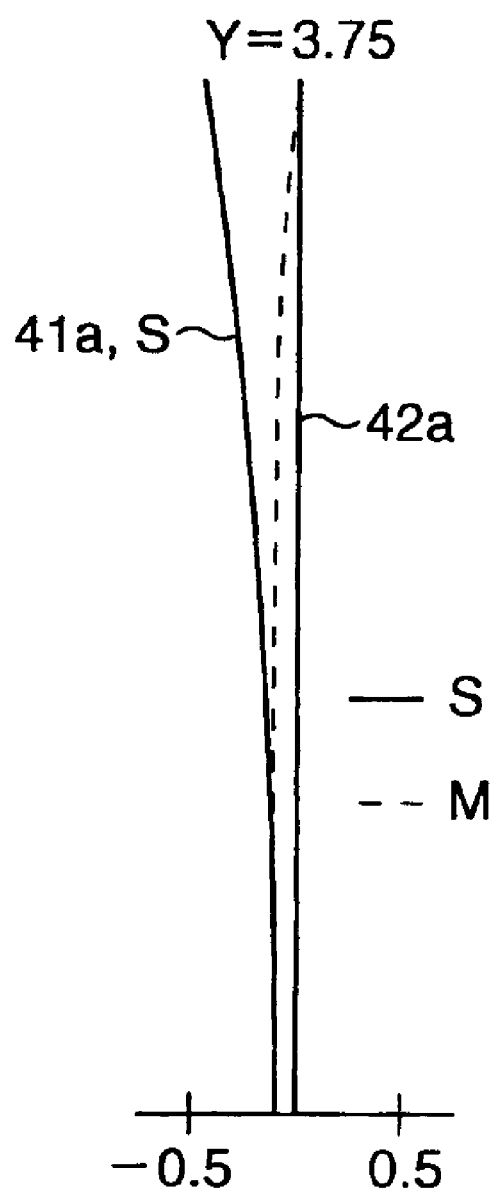
FIG. 10 is a graph which shows a relationship between a reticle forming surface of a reference plate and the astigmatism of an eyepiece in the third embodiment.

FIG. 10 is a graph showing an astigmatism of the eyepiece 20, on the surface 42a of the glass plate 42 of the reference plate 40, in the third embodiment. The axis of ordinates represents the surface 42a.

As described above, the reticle A1 of FIG. 8 or A2 of FIG. 9 is formed on the surface 41a (the seventh surface) of the glass plate 41, and the frame of the field of view F1 of FIG. 8 or F2 of FIG. 9 is formed on the surface 42a (the eighth surface) of the glass plate 42. Namely, since the surface 41a, on which the reticle is formed to extend radially from the optical axis, is curved along the field curvature of the sagittal image surface of the eyepiece 20, the reticle can be clearly viewed. In this situation, the astigmatism is identical to that of FIG. 4.

The surface 42a, on which the frame of the field of view is formed around the periphery, is situated in such a manner that a predetermined gap (0.1 mm in this embodiment) exits between the surfaces 41a and 42a, and at the peripheral portion of the field of view, the surface 42a is curved so as to approximately accord with the meridional image surface of the eyepiece 20.

In FIG. 10, since the astigmatism of the eyepiece 20, which is imaged on the surface 41a, is indicated on the surface 42a, there is a gap corresponding to the distance between the surfaces 41a and 42a, between the origins corresponding to the surface 41a and the surface 42a. Also, in FIG. 10, since the meridional image surface accords with the surface 42a at its peripheral portion, it is realized that the frame of the field of view can be clearly viewed. Accordingly, when the observer observes the object through the eyepiece 20, both the reticle and the frame can be clearly viewed. This effect is more noticeable, when the cross hairs of FIG. 2 or the scale of FIG. 3 is formed as the reticle.

Further, as the radius of curvature of the glass plate 41 is different from the radius of curvature of the glass plate 42, a gap exists between the glass plates 41 and 42. The gap is formed so as to be slightly widened in the direction from the central portion to the peripheral portion. In the third embodiment, a sealing member 100 is provided in order to prevent dust from entering the gap and collecting on the surfaces 41a and 42a, and thereby damaging the surfaces 41a and 41a. The sealing member 100 includes a main ring 101, a press ring 102, and a gap ring 103. Note that, one portion of each of these rings is depicted in FIG. 7 in order to avoid excess complexity of the drawing, however, the sealing member 100 covers the glass plates 41 and 42.

Figure 11:
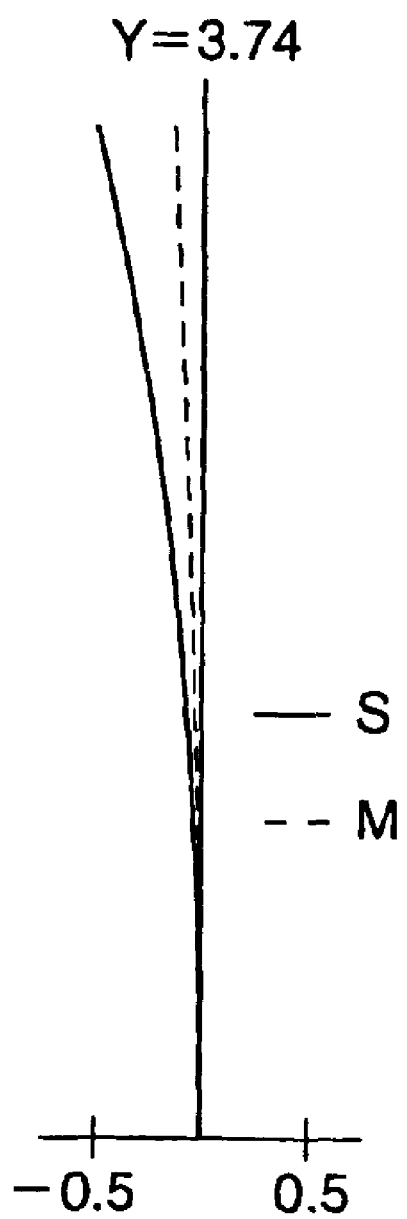
FIG. 11 is a graph which shows a relationship between a reference plate and the astigmatism of an eyepiece, of a conventional viewing device which is compared with the first through third embodiments.

Now, a conventional viewing device is compared with the first through third embodiments. The following TABLE 4 represents optical data of the eyepiece 20 and a conventional reference plate of the conventional viewing device. FIG. 11 is a graph showing the astigmatism of the eyepiece 20 on the reticle forming surface of the conventional reference plate.

TABLE 4

F = 9.43
apparent field of view = 24.3°

| NO | R | D | N(d) | Vd |
|---|---|---|---|---|
| pupil position | INFINITY | 8.70 | | |
| 1 | 16.161 | 1.20 | 1.78472 | 25.7 |
| 2 | 8.190 | 5.75 | 1.69680 | 55.5 |
| 3 | −19.310 | 2.54 | | |
| 4 | 7.700 | 5.00 | 1.49176 | 57.4 |
| 5 | 30.030 | 2.01 | | |
| 6 | INFINITY | 1.00 | 1.51633 | 64.1 |

TABLE 4-continued

F = 9.43
apparent field of view = 24.3°

| NO | R | D | N(d) | Vd |
|---|---|---|---|---|
| 7 | INFINITY image surface | 1.00 | 1.51633 | 64.1 |
| 8 | INFINITY | 1.00 | 1.51633 | 64.1 |

The conventional reference plate includes two glass plates, and a reticle is formed on a surface of one of the two glass plates, and the surface is bonded with the other glass plate. These features are similar to the first and second embodiments. However, the two glass plates are flat plates, as indicated by the radius of curvature (R) of the sixth through eighth surfaces in TABLE 4. Further, as shown in FIG. 11, the reticle forming surface (the axis of ordinates) does not accord with the field curvatures of the sagittal and meridional image surfaces of the eyepiece 20. Accordingly, some portions of the reticle can not be clearly viewed.

Figure 12:
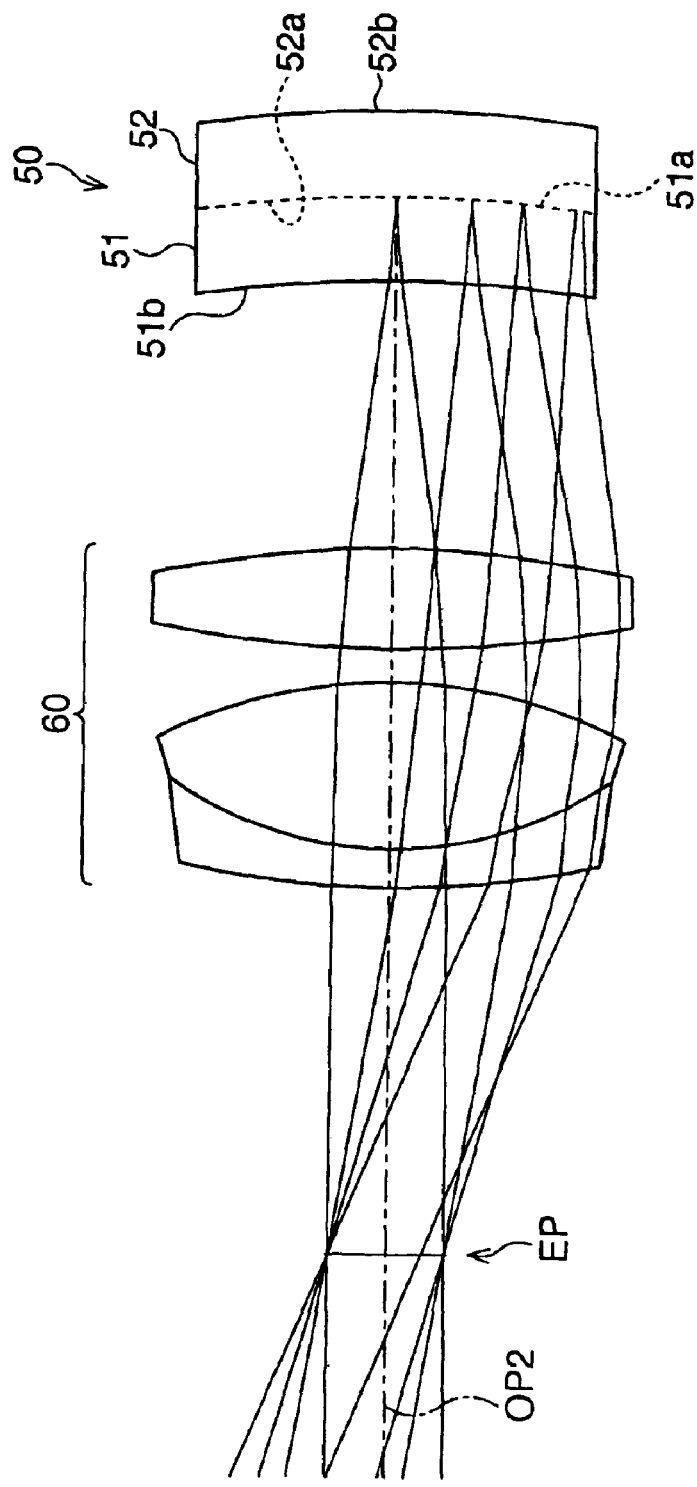
FIG. 12 is a drawing which shows the structure of an eyepiece and a reference plate of a viewing device to which a fourth embodiment according to the present invention is applied.

FIG. 12 shows an eyepiece and a reference plate of a viewing device to which a fourth embodiment according to the present invention is applied. A reference plate 50 is situated on the optical axis OP2 of an eyepiece 60. The reference plate 50 includes a glass plate 51 and a glass plate 52, one surface 51a of the glass plate 51 and one surface 52a of the glass plate 52 are bonded with each other. The reticle is formed on the surface 51a (reticle forming surface) of the glass plate 51, similarly to the first through third embodiments.

The following TABLE 5 represents optical data of the fourth embodiment. The data of TABLE 5 represents optical characteristics of the reference plate 50 and the eyepiece 60, in a state where a luminance is incident at the left side of FIG. 12.

TABLE 5

F = 19.82
apparent field of view = 22.6°

| NO | R | D | N(d) | Vd |
|---|---|---|---|---|
| pupil position | | 16.50 | | |
| 1 | 42.000 | 1.70 | 1.74077 | 27.8 |
| 2 | 16.500 | 7.50 | 1.58913 | 61.2 |
| 3 | −22.000 | 1.50 | | |
| 4 | 53.000 | 4.50 | 1.49176 | 57.4 |
| 5 | −39.000 | 11.95 | | |
| 6 | −58.520 | 3.80 | 1.51633 | 64.1 |
| 7 | −58.520 | 3.80 | 1.51633 | 64.1 |
| 8 | −58.520 | | | |

Similar to the first embodiment, in the fourth embodiment, the incident surface (the surface 51b of the glass plate 51, the sixth surface) and the exit surface (the surface 52b of the glass plate 52, the eighth surface) of the reference plate 50 are curved at the same radius of curvature (−58.520) as that of the surface 51a which is the reticle forming surface. This radius of curvature is determined such that the sagittal ray of the eyepiece 60, which passes through the glass plate 51, is imaged on the surface 51a.

Figure 13:
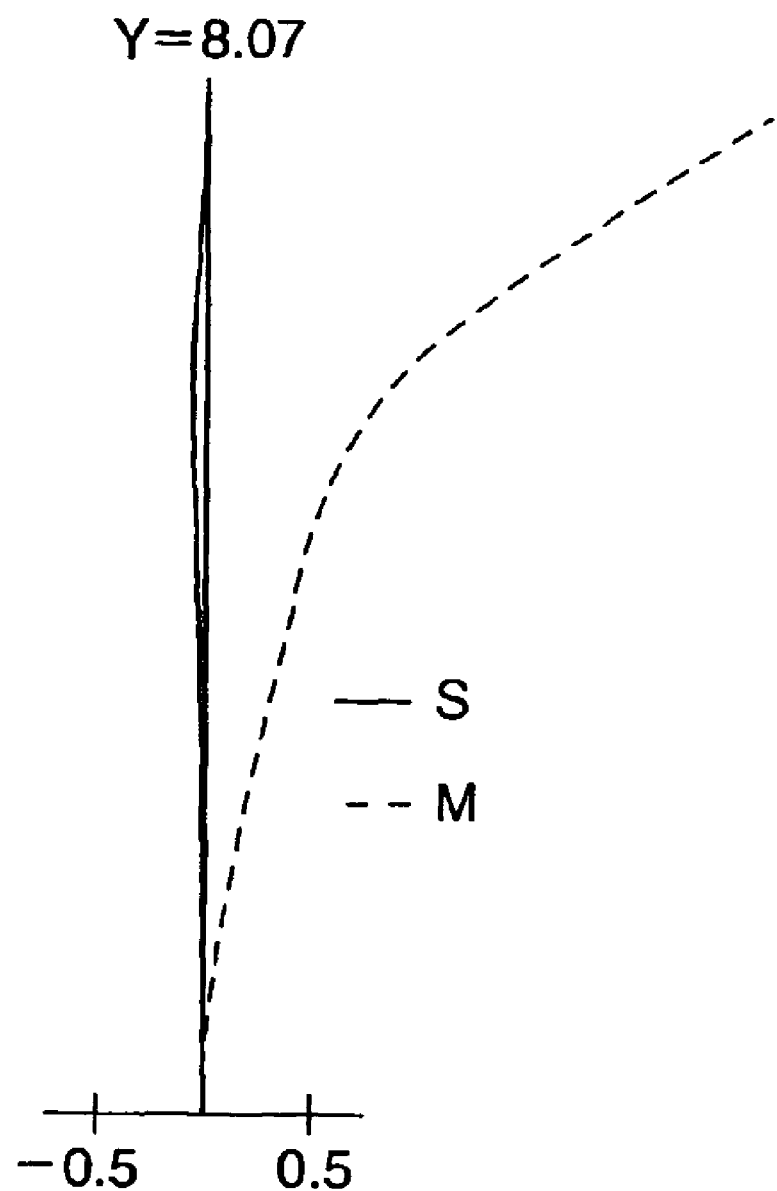
FIG. 13 is a graph which shows a relationship between a reticle forming surface of a reference plate and the astigmatism of an eyepiece in the fourth embodiment.

FIG. 13 is a graph showing an astigmatism of the eyepiece 60, on the surface 51a of the glass plate 51 of the reference plate 50. As shown in FIG. 13, the surface 51a (the axis of ordinates), which is the reticle forming surface, approximately accords with the sagittal image surface. Accordingly, when the reticle, which is formed to extend radially from the optical axis, is viewed through the eyepiece 60 at the pupil position EP, the image of the reticle does not partially blur.

Further, in the fourth embodiment, similar to the first embodiment, the incident surface and the exit surface of the reference plate 50 are curved at the same radius of curvature as that of the surface 51a which is the reticle forming surface. Namely, similar to the first embodiment, the reference plate does not have significant refracting power. Accordingly, the reference plate hardly influences the aberration of the viewing optical system.

Figure 14:
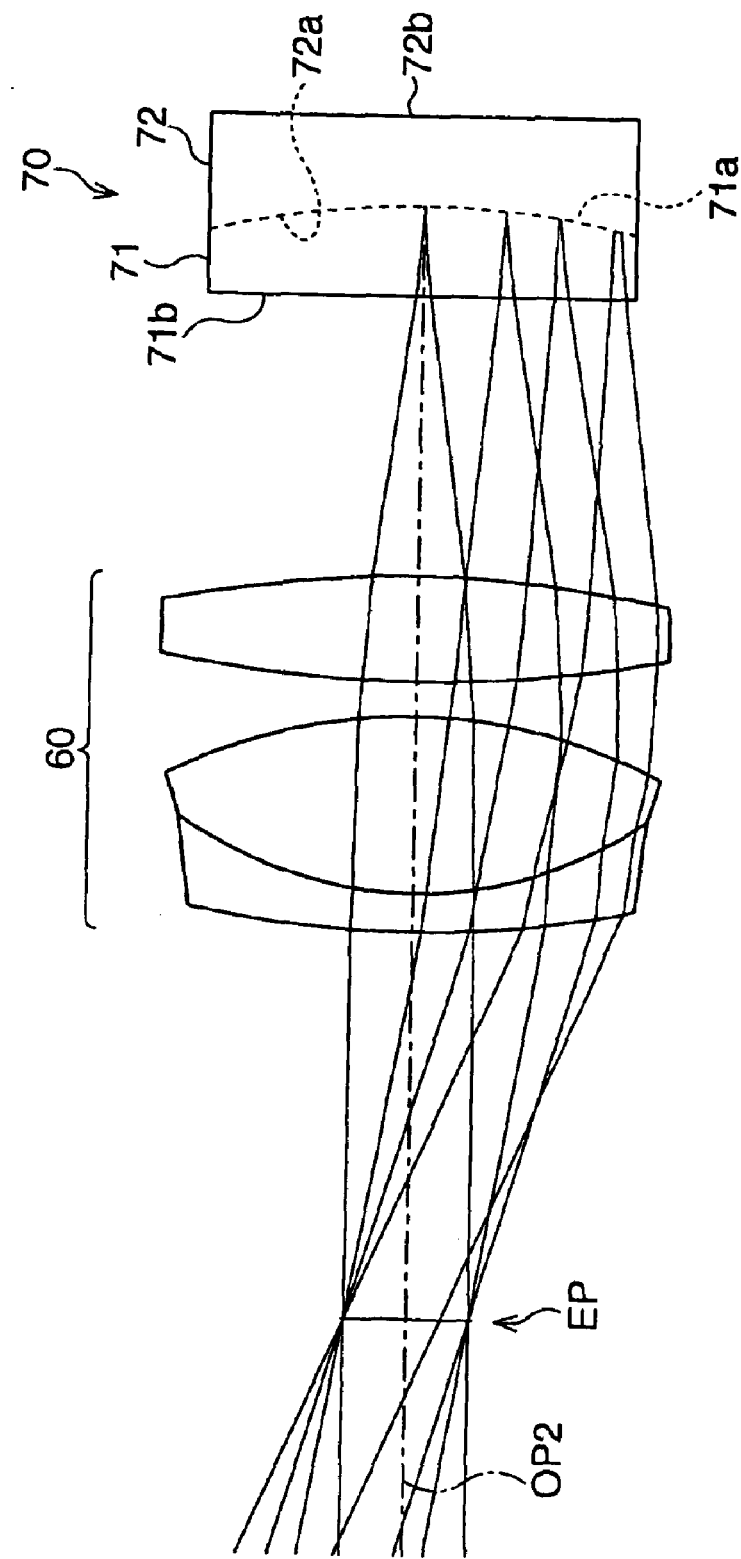
FIG. 14 is a drawing which shows a structure of an eyepiece and a reference plate of a viewing device to which a fifth embodiment according to the present invention is applied.

FIG. 14 shows an eyepiece and a reference plate of a viewing device to which a fifth embodiment according to the present invention is applied. In the fifth embodiment, similar to the fourth embodiment, the eyepiece 60 is used, and a reference plate 70 similar to the reference plate 30 of the second embodiment is used. Namely, the reference plate 70 includes a glass plate 71 and a glass plate 72, a surface 71a of the glass plate 71 and a surface 72a of the glass plate 72 are bonded, a reticle is formed on the surface 71a, and a surface 71b of the glass plate 71 and a surface 72b of the glass plate 72 are flat planes.

The following TABLE 6 represents optical data of the fifth embodiment. The data of TABLE 6 represents optical characteristics of the reference plate 70 and the eyepiece 60, in a state where a luminance is incident at the left side of FIG. 14.

TABLE 6

F = 19.33
apparent field of view = 23.1°

| NO | R | D | N(d) | Vd |
|---|---|---|---|---|
| pupil position |  | 16.50 |  |  |
| 1 | 42.000 | 1.70 | 1.74077 | 27.8 |
| 2 | 16.500 | 7.50 | 1.58913 | 61.2 |
| 3 | −22.000 | 1.50 |  |  |
| 4 | 53.000 | 4.50 | 1.49176 | 57.4 |
| 5 | −39.000 | 11.89 |  |  |
| 6 | INFINITY | 3.80 | 1.51633 | 64.1 |
| 7 | −35.000 | 3.80 | 1.51633 | 64.1 |
|  | image surface |  |  |  |
| 8 | INFINITY |  |  |  |

The surface 71a of the glass plate 71 and the surface 72a of the glass plate 72, which are bonded, correspond to the seventh surface. The radius of curvature (−35.000) of the surface 71a which is the reticle forming surface is determined such that the sagittal ray of the eyepiece 60, which passes through the plane surface 71b (the sixth surface), is imaged on the surface 71a. Similar to the reference plate 30 of the second embodiment, the incident and exit surfaces of the reference plate 70 are flat planes, and only the bonded surfaces of the glass plate 71 and 72 are curved in accordance with the field curvature of the sagittal image surface.

Figure 15:
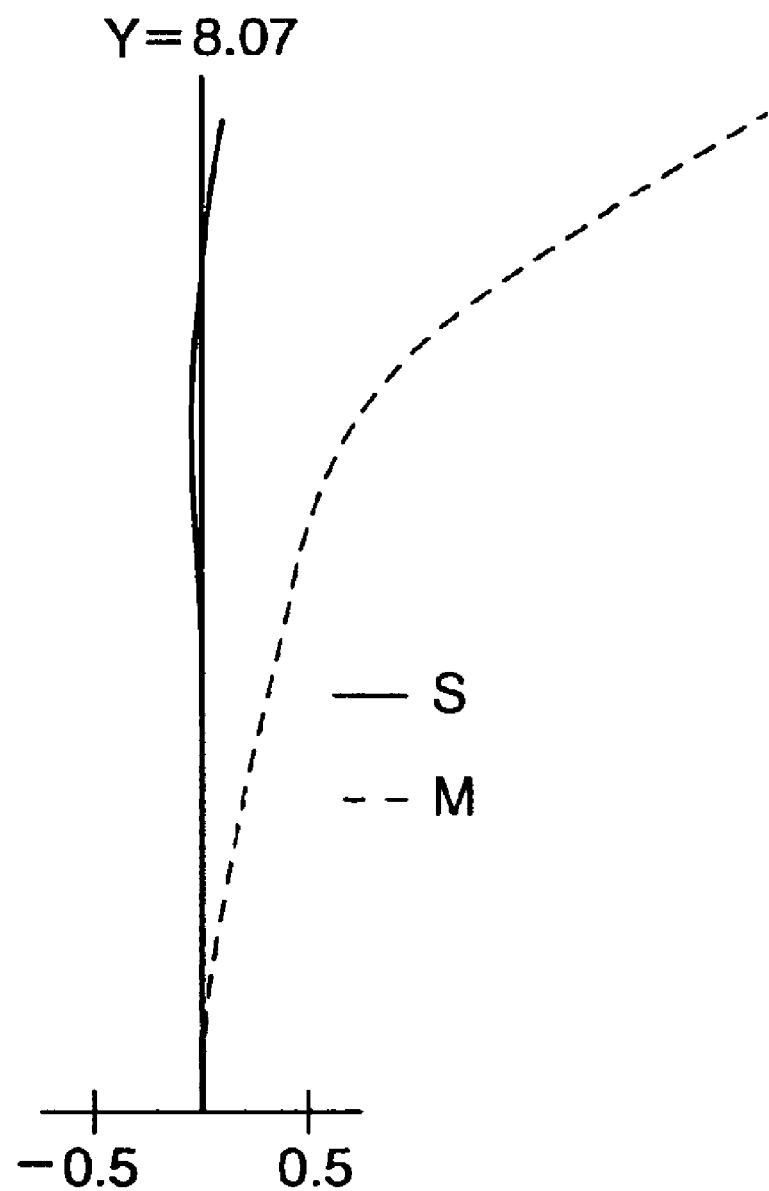
FIG. 15 is a graph which shows a relationship between a reticle forming surface of a reference plate and the astigmatism of an eyepiece in the fifth embodiment.

FIG. 15 is a graph showing an astigmatism of the eyepiece 60, on the surface 71a of the glass plate 71 of the reference plate 70. As shown in FIG. 15, the surface 71a (the axis of ordinates), which is the reticle forming surface, approximately accords with the sagittal image surface. Accordingly, when the reticle, which is formed to extend radially from the optical axis, is viewed through the eyepiece 60 at the pupil position EP, the image of the reticle is not partially blurred.

Further, as the incident and exit surfaces of the reference plate are flat planes, an effect similar to the second embodiment can be obtained.

Figure 16:
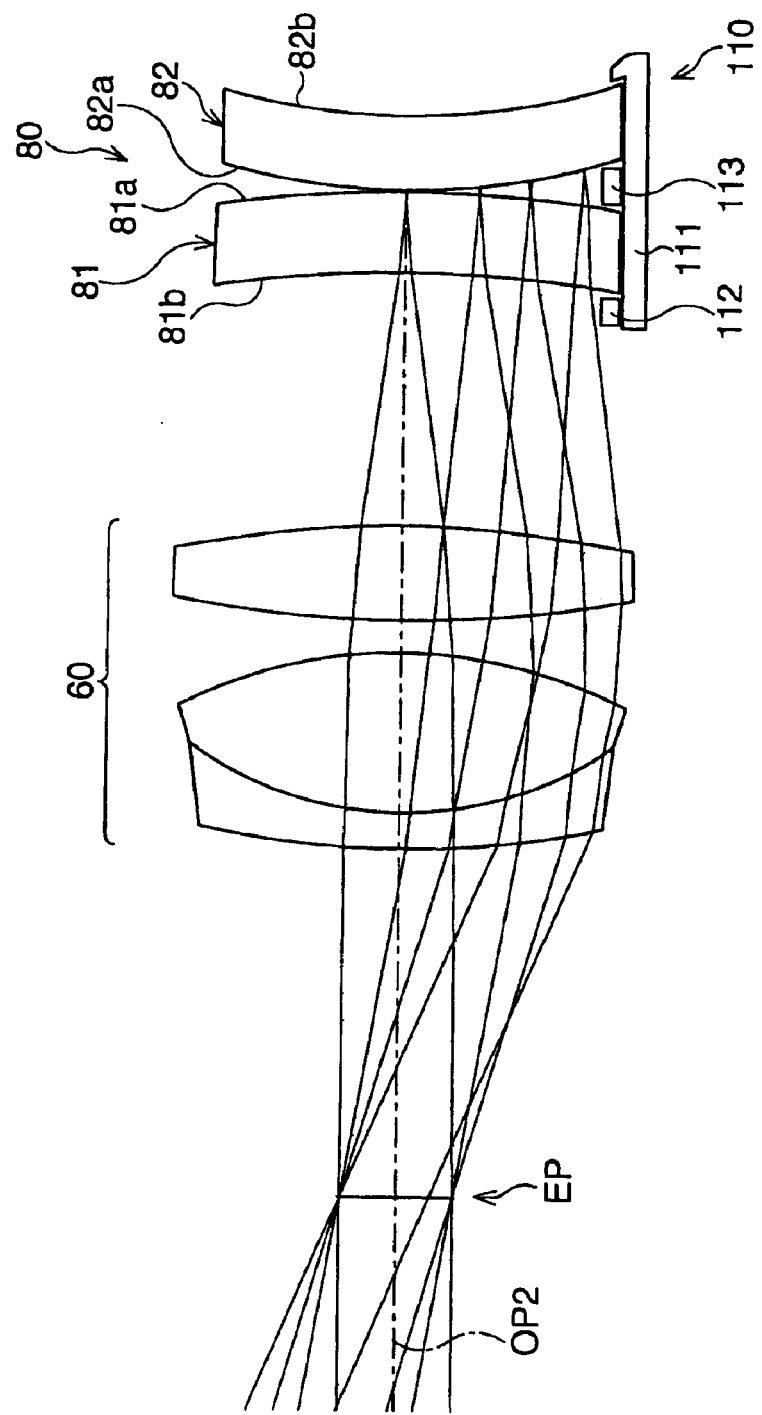
FIG. 16 is a drawing which shows a structure of an eyepiece and a reference plate of a viewing device to which a sixth embodiment according to the present invention is applied.

FIG. 16 shows an eyepiece and a reference plate of a viewing device to which a sixth embodiment according to the present invention is applied. In the sixth embodiment, the eyepiece 60 of the fourth and fifth embodiments is used, and a reference plate 80 similar to the reference plate 40 of the third embodiment is used. The reference plate 80 includes a glass plate 81 and a glass plate 82, a reticle is formed on a surface 81a (reticle forming plate) of the glass plate 81, and a frame for field of view is formed on a surface 82a (frame forming surface) of the glass plate 82.

The following TABLE 7 represents optical data of the sixth embodiment. The data of TABLE 7 represents optical characteristics of the reference plate 80 and the eyepiece 60, in a state where a luminance is incident at the left side of FIG. 16.

TABLE 7

F = 19.75
apparent field of view = 22.8°

| NO | R | D | N(d) | Vd |
|---|---|---|---|---|
| pupil position |  | 16.50 |  |  |
| 1 | 42.000 | 1.70 | 1.74077 | 27.8 |
| 2 | 16.500 | 7.50 | 1.58913 | 61.2 |
| 3 | −22.000 | 1.50 |  |  |
| 4 | 53.000 | 4.50 | 1.49176 | 57.4 |
| 5 | −39.000 | 11.95 |  |  |
| 6 | −58.520 | 3.80 | 1.51633 | 64.1 |
| 7 | −58.520 | 0.10 |  |  |
|  | (cross hairs) |  |  |  |
| 8 | 31.000 | 3.80 | 1.51633 | 64.1 |
|  | (frame of field of view) |  |  |  |
| 9 | 31.000 |  |  |  |

The sixth surface is the surface 81b of the glass plate 81, the seventh surface is the surface 81a of the glass plate 81, the eighth surface is the surface 82a of the glass plate 82, and the ninth surface is the surface 82b of the glass plate 82. The sixth and seventh surfaces have the same radius of curvature (−58.520). The value of this radius of curvature is equal to the value of the radius of curvature of the surface 51a of the fourth embodiment (see FIG. 12 and TABLE 5). Namely, the radius of curvature of the sixth and seventh surfaces is determined such that the sagittal ray of the eyepiece 60, which passes through the surface 81b of the glass plate 81, is imaged on the surface 81a. Further, the eighth and ninth surfaces have the same radius of curvature (31.000). The value of this radius of curvature is determined such that the meridional ray of the eyepiece 60, which passes through the glass plate 81, is imaged on the surface 82a.

Figure 17:
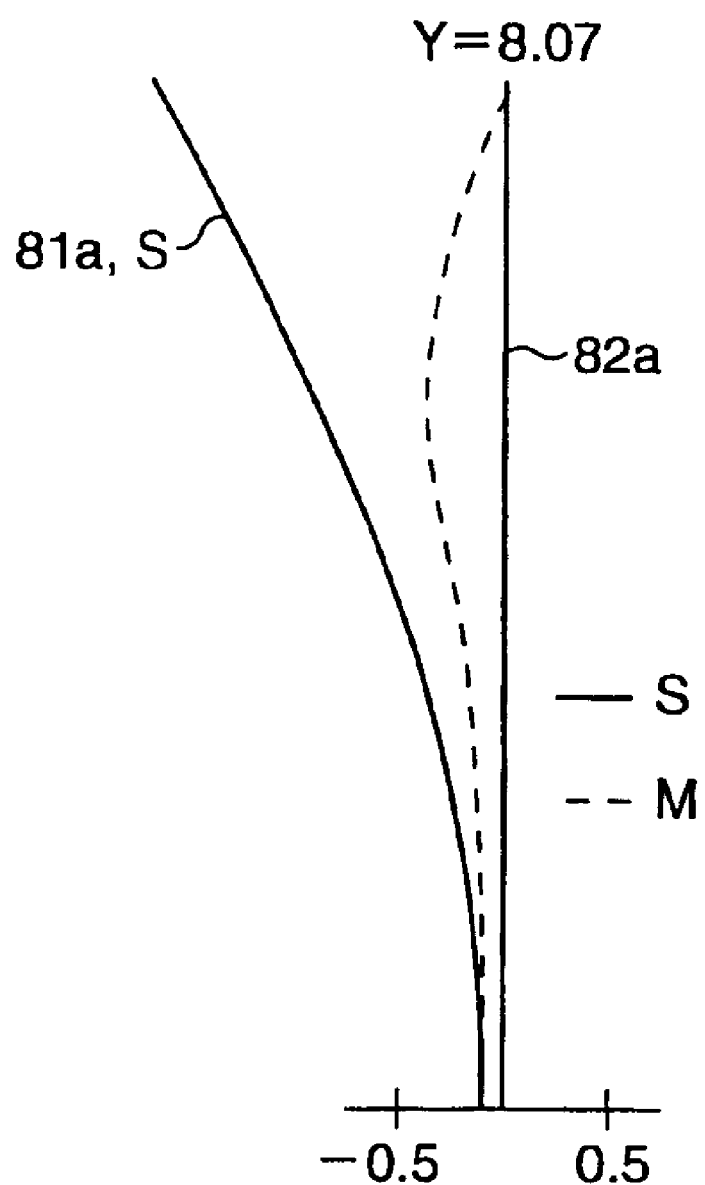
FIG. 17 is a graph which shows a relationship between a reticle forming surface of a reference plate and the astigmatism of an eyepiece in the sixth embodiment.

FIG. 17 is a graph showing an astigmatism of the eyepiece 60, on the surface 82a of the glass plate 82 of the reference plate 80. The axis of ordinates represents the surface 82a. Note that the astigmatism of the eyepiece 60 on the surface 81a of the glass plate 81 of the reference plate 80 is identical to the astigmatism of the eyepiece 50 shown in FIG. 13.

In the sixth embodiment, on the surface 81a, the reticle is formed to extend radially from the optical axis, and similarly to the third embodiment, the surface 81a is curved in accordance with the field curvature of the sagittal image surface of the eyepiece 60. Further, the frame of the field of view is formed on the surface 82a in the peripheral direction, and the surface 82a is positioned in such a manner that a predetermined gap (0.1 mm in this embodiment) exists between the surface 82a and the surface 81a which accords with the of the paraxial image surface of the eyepiece 60. However, the surface 82a is curved so as to approximately accord with the meridional image surface at the peripheral portion of the field of view. Accordingly, when the observer observes the object through the eyepiece 60 at the pupil position EP, both the reticle and the frame of the field of view can be clearly viewed. Note that, a sealing member 110, which includes a main ring 111, a press ring 112, and a gap ring 113, covers the glass plates 81 and 82 for the same reason as that given in the third embodiment. In FIG. 16, one portion of each of these rings is depicted in order to avoid excess complexity of the drawing.

Figure 18:
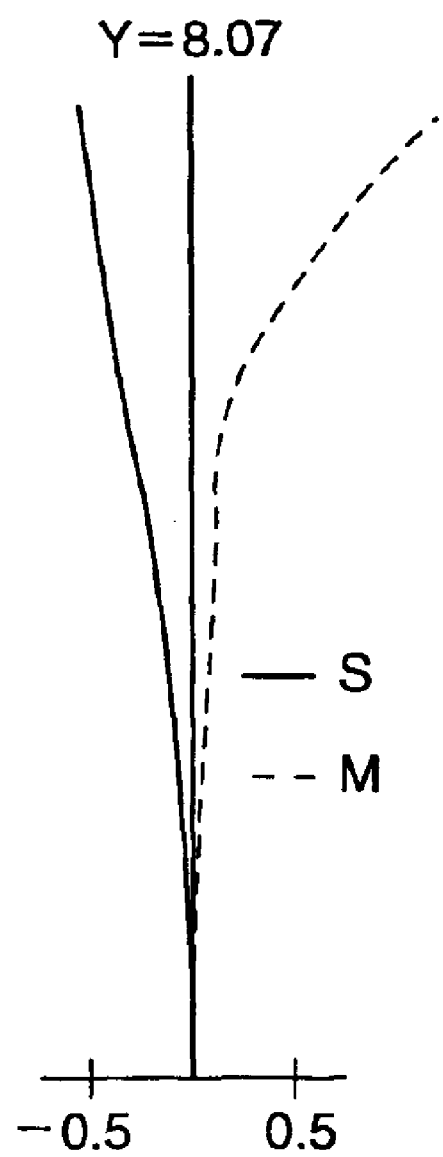
FIG. 18 is a graph which shows a relationship between a reference plate and the astigmatism of an eyepiece, of a conventional viewing device which is compared with the fourth through sixth embodiments.

Now, another conventional viewing device is compared with the fourth through sixth embodiments. The following TABLE 8 represents optical data of the eyepiece 60 and a conventional reference plate of the conventional viewing device. FIG. 18 is a graph showing the relationship between the reticle forming surface of the conventional reference plate and the astigmatism of the eyepiece 60.

TABLE 8

F = 19.33
apparent field of view = 23.2°

| NO | R | D | N(d) | Vd |
|---|---|---|---|---|
| Pupil position |  | 16.50 |  |  |
| 1 | 42.000 | 1.70 | 1.74077 | 27.8 |
| 2 | 16.500 | 7.50 | 1.58913 | 61.2 |
| 3 | −22.000 | 1.50 |  |  |
| 4 | 53.000 | 4.50 | 1.49176 | 57.4 |
| 5 | −39.000 | 11.89 |  |  |
| 6 | INFINITY | 3.80 | 1.51633 | 64.1 |
| 7 | INFINITY | 3.80 | 1.51633 | 64.1 |
|  | image surface |  |  |  |
| 8 | INFINITY | 3.80 |  |  |

The conventional reference plate includes two glass plates, a reticle is formed on a surface of one of the two glass plates, the surface is bonded with one surface of the other glass plate, and the bonded surfaces correspond to the seventh surface. These features are similar to those of the fourth and fifth embodiments. However, the two glass plates are flat plates, as indicated by the radius of curvature (R) of the sixth through eighth surfaces in TABLE 8. Further, as shown in FIG. 18, the reticle forming surface (the axis of ordinates) does not accord with the field curvatures of the sagittal and meridional image surfaces of the eyepiece 60. Accordingly, some portions of the reticle can not be clearly viewed.

As described above, according to the present invention, the reference plate which is provided in the viewing device is curved in accordance with the field curvature of the eyepiece Accordingly, when the object is observed through the viewing device, both the object and the reticle formed on the reference plate can be clearly viewed.

The present disclosure relates to subject matter contained in Japanese Patent Application No.P2002-245621 (filed on Aug. 26, 2002) which is expressly incorporated herein, by reference, in its entirety.

What is claimed is:

1. A viewing device comprising:

an eyepiece; and a reference plate that is provided with a first clear plate including a reticle forming surface on which a reticle is formed, said reference plate being positioned on an optical axis of said eyepiece, and further provided with a second clear plate including a frame forming surface on which a frame for a field of view is formed;

wherein said reticle forming surface is curved in accordance with a field curvature of said eyepiece, wherein said reticle forming surface and said frame forming surface are arranged so as to face each other, and wherein the radius of curvature of said reticle forming surface and the radius of curvature of said frame forming surface are different.

2. A viewing device according to claim 1, wherein said reticle forming surface is curved so as to approximately accord with a field curvature of a sagittal image surface of said eyepiece.

3. A viewing device according to claim 1, wherein said first and second clear plates are bonded in such a manner that said reticle forming surface is a bonded surface.

4. A viewing device according to claim 3, wherein, on said reference plate, both an incidence surface and an exit surface are planar.

5. A viewing device according to claim 1, wherein said reference plate has no significant refracting power.

6. A viewing device according to claim 1, wherein said frame forming surface is curved so as to approximately accord with a field curvature of a meridional image surface of said eyepiece.

7. A viewing device according to claim 1, further comprising a sealing member that hermetically seals a gap which is formed between the peripheral portions of said first and second clear plates.

* * * * *